US005463260A

United States Patent [19]

Ono

[11] Patent Number: 5,463,260

[45] Date of Patent: Oct. 31, 1995

[54] TRIGGER DEVICE FOR TRIGGERING A PASSIVE RESTRAINT DEVICE IN A CAR

[75] Inventor: Katsuyasu Ono, Kanagawa, Japan

[73] Assignee: NSK Ltd., Tokyo, Japan

[21] Appl. No.: 139,104

[22] Filed: Oct. 20, 1993

[30] Foreign Application Priority Data

Jan. 20, 1993 [JP] Japan .............................. 5-004044 U

[51] Int. Cl.[6] .......................... H01H 35/14; B60K 28/10; B60R 21/32

[52] U.S. Cl. ............. 307/121; 200/61.08; 200/61.45 M; 180/282; 280/735; 307/10.1

[58] Field of Search ......................... 200/61.45 R, 61.53, 200/61.45 M; 335/205, 206, 207; 307/116–121; 280/731–735; 180/282

[56] References Cited

U.S. PATENT DOCUMENTS

| | | | |
|---|---|---|---|
| 3,803,374 | 4/1974 | Delgendre | 200/61.08 |
| 3,840,088 | 10/1974 | Marumo et al. | 180/282 |
| 3,853,199 | 12/1974 | Hirashima et al. | 200/61.45 R |
| 4,030,061 | 6/1977 | Gaskell et al. | 200/61.08 X |
| 4,329,549 | 6/1982 | Breed | 200/61.45 M |
| 4,518,835 | 5/1985 | Grossar | 200/61.45 M |
| 4,639,563 | 1/1987 | Gunther et al. | 200/61.45 M |
| 4,873,401 | 10/1989 | Ireland | 200/61.45 M |
| 4,965,416 | 10/1990 | Bachmann | 200/61.45 M |
| 5,149,926 | 9/1992 | Ono | 200/61.45 M |
| 5,177,370 | 1/1993 | Meister | 307/10.1 |

FOREIGN PATENT DOCUMENTS

| | | | |
|---|---|---|---|
| 2006057 | 5/1983 | Germany | A62B 35/00 |
| 9015315 | 12/1990 | WIPO | G01L 5/00 |

*Primary Examiner*—J. R. Scott
*Attorney, Agent, or Firm*—Sughrue, Mion, Zinn, Macpeak & Seas

[57] ABSTRACT

A trigger device which, when it is used in a seat belt tightening device or in an air bag device, prevents the malfunction to enhance reliability and also which is simple in structure, is easy to assemble and is inexpensive. The trigger device includes an ignition circuit which, when an opening/closing switch 24 is closed, allows the electricity of a power supply 23 to flow to ignite a gas generator 8, a movable magnet 22 which, when a car is suddenly decelerated, can be inertially moved to a first position to close the opening/closing switch 24 to electrically energize the ignition circuit, and a fixed magnet 21 fixed to a frame 20 of a non-magnetic member so as to be able to hold the movable magnet 22 at a second position, in which the opening/closing switch 24 is opened, by a repelling magnetic force acting between the movable and fixed magnets. And, when a predetermined or greater acceleration is applied to the movable magnet 22, then the movable magnet 22 is moved to the direction of the first position against the repelling magnetic force acting between the fixed and movable magnets so as to be able to electrically energize the ignition circuit.

13 Claims, 6 Drawing Sheets

TRIGGER DEVICE FOR TRIGGERING A PASSIVE RESTRAINT DEVICE IN A CAR

BACKGROUND OF THE INVENTION

The present invention relates to an improved trigger device for starting a seat belt tightening device which rotates a winding shaft of a retractor in a seat belt retracting direction, or an air bag device which protects a passenger from shocks given in a car collision by expanding an air bag suddenly by filling the air with gas.

In recent years, for the purpose of protecting a passenger in an emergency such as in a car collision or the like, there has been used a passive restraint device such as a seat belt tightening device, an air bag device and other similar devices.

In the above-mentioned seat belt tightening device, for example, a piston is connected to one end portion of a cable-shaped member which is wound about a pulley mounted on a winding shaft of a retractor and, when a tension force is applied to the cable-shaped member by means of a thrust force caused by the expansion pressure of a gaseous matter acting on the piston slidably received in a cylinder, then the cable-shaped member drives and pulls the retractor shaft in a direction to wind or retract a webbing, so that the webbing extended over the passenger can be pulled in or retracted in an emergency. Therefore, in the case of the seat belt tightening device, there is included a gas generator which is used to act on the piston provided within the cylinder to thereby apply a tensile force to the cable-shaped member. The gas generator contains therein an ignition heater and powder. In particular, the gas generator energizes the ignition heater electrically in response to a signal from a collision sensor and allows the powder to be ignited due to the heat that is generated by the ignition heater, thereby generating a gas.

Referring to the above-mentioned air bag device, for example, a module comprising a center pad, a folded air bag, a gas generator and the like is stored in a steering wheel. In a car collision, the gas generator is ignited to burn a gas suddenly and the air bag is instantaneously expanded by the suddenly burnt gas, whereby the body of a passenger is received by the expanded air bag to thereby be able to minimize the shock to the passenger. Therefore, in the case of the air bag device, there is included a gas generator which is used to supply an expansion gas for expanding the air bag. In particular, the gas generator ignites ignition powder to burn powder and then the powder is burnt suddenly to generate the expansion gas.

Accordingly, in the respective gas generators used in the above-mentioned seat belt tightening device and air bag device, a trigger device is required which, after a car collision is detected, ignites ignition powder to thereby operate the gas generators. And, as a sensor which is used to detect a collision, the trigger device of this type employs any of various sensors such as an electric sensor, an electronic sensor and a mechanical sensor.

The electric sensor is arranged such that, when an inertial member is moved a certain distance due to shock it closes a circuit, electrically energizes an ignition heater provided within the ignition powder of the gas generator, and thus ignites the ignition powder by means of the heat that is generated by the ignition heater. Also, referring to the function of the above-mentioned electronic sensor, it is the same as a generally used acceleration sensor. In other words, the electronic sensor simply outputs ever-changing accelerations as detect singles and the sensor itself does not judge a collision. That is, a control circuit, on receipt of the detect signals of the electronic sensor, analyzes the waveforms of vibrations caused by a collision to thereby judge the collision, and then energizes an ignition heater electrically. Further, referring to the mechanical sensor, similarly to the electric sensor, if a car collision occurs, then an inertial member is moved to remove a stopper mechanically, a trigger is caused to collide with a percussion cap provided in ignition powder due to the energizing force of energizing means which is removed from the stopper, and the ignition powder is thus ignited by the shock of the trigger.

However, in the case of the trigger device using the above-mentioned electronic sensor, car acceleration detect means such as an acceleration sensor or the like which detects the acceleration speed of a car and issues a detect signal, and a control circuit which judges in accordance with the detect signal whether the ignition heater may be electrically energized are required. This increases the number of parts used and complicates the structure of the start device. In addition to this, wiring for connecting the parts of the start device with one another must be connected positively to guarantee a system reliability, which worsens the assembling workability of the trigger device, resulting in an expensive system.

In the start device using the electric sensor, for example, in order to prevent the trigger device from being operated by other shocks, which may occur when a car body is hit by a hammer for repairing the car body, for example there are provided a plurality of sensors or the movement of the inertial member is braked by means of a viscous or resistance mertial. That is, the duration of the shocks is also added to the judgement elements to thereby prevent the start device from responding to pulse-like accelerations (the duration thereof is of the order of 2 ms.). However, in order to enhance the sensitivity of the electric sensor, there is required a high working accuracy and also there is increased the possibility of the malfunction thereof, which makes it difficult to change the acceleration detect characteristic of the sensor. As a result of this, the system provides only a small degree of freedom of design.

Further, in the case of the trigger device using the mechanical sensor, to ignite the percussion cap, the trigger must be moved somewhat greatly and at a high speed. For this reason, the trigger used to strike the percussion cap is provided separately from the inertial member which is used to sense the acceleration. As a result of this, the response time from the beginning of the movement of the inertial member to the ignition of the ignition powder is apt to be slower when compared with the start device using the electric sensor.

SUMMARY OF THE INVENTION

In view of the above circumstances, the present invention aims at eliminating the problems found in the above-mentioned conventional trigger devices. Accordingly, it is an object of the invention to provide an inexpensive trigger device which can prevent the malfunction thereof to thereby enhance the reliability thereof and is simple in structure for easy assembling.

In attaining the above object, according to the invention, there is provided a trigger device which can be operated in response to a predetermined or greater acceleration to ignite a gas generator (8), the trigger device comprising: an ignition circuit including an electric ignition device (11) which, when electrically energized, can ignite the gas generator (8); switch means (24, 82) for electrically energizing the ignition circuit; a movable magnet (22, 35, 44, 55, 65, 87) which can be moved inertially when a car is suddenly decelerated and also which is able to take a first position to operate the switch means (24, 82) to thereby energize the ignition circuit electrically and a second position not to operate the switch means (24, 82); and, a fixed magnet (21, 34, 43, 54, 64, 86) which is fixedly mounted in such a manner that it can hold the movable magnet (22, 35, 44, 55, 65, 87) at the second position. In particular, the present trigger device is characterized in that the fixed magnet is fixed to a frame (20, 32, 42, 52, 62) which is mounted to a car body so as to move in the same manner as the car body, and also in that, when a predetermined or greater acceleration is being applied to the movable magnet (22, 35, 44, 55, 65, 87) continuously for a relatively long period of time, then the movable magnet (22, 35, 44, 55, 65, 87) is moved toward the first position against a magnetic force acting between the movable magnet and the fixed magnet (21, 34, 43, 54, 64, 86) so as to electrically energize the ignition circuit.

According to another aspect of the invention, there is provided a trigger device which can be operated in response to a predetermined or greater acceleration to ignite a gas generator (8), the trigger device comprising: an ignition circuit including an electric ignition device (11) which, when electrically energized, can ignite the gas generator (8); a coil (76) disposed in a recess (73) formed in a frame (72) mounted to a car body; a movable magnet (75) which is disposed within the coil (76) and is arranged such that, when it moves within the coil (76), it generates an induced electromotive current to thereby energize the ignition circuit electrically, the movable magnet (75) being able to take a first position to energize the ignition circuit electrically and a second position not to energize the ignition circuit electrically; and, a fixed magnet (74) which is fixed to the frame (72) mounted to the car body. In particular, the trigger device is characterized in that the movable magnet (75) is normally energized to the second position by means of a repelling magnetic force acting between the movable magnet (75) and the fixed magnet (74), and also in that, when a predetermined or greater acceleration is being continuously applied to the movable magnet (75) for a relatively long period of time, then the movable magnet (75) is moved to the first position against the repelling magnetic force acting between the movable magnet (75) and the fixed magnet (74) so as to be able to energize said ignition circuit electrically.

According to another aspect of the invention, there is provided a trigger device which can be operated in response to a predetermined or greater acceleration to ignite a gas generator (8), for use in a seat belt tightening device which is driven by a gas pressure to rotate a winding shaft of a retractor (1) in a seat belt retracting direction in a car collision, the trigger device comprising: an ignition circuit which, when energized electrically, allows the electricity of a power supply (23) to flow through an ignition heater (11) to thereby ignite the gas generator (8); an opening/closing switch (24, 82) for energizing the ignition circuit electrically; a movable magnet (22, 35, 44, 55, 65, 87) of an inertially movable type which is able to take a first position to close the opening/closing switch (24, 82) to thereby energize the ignition circuit electrically and a second position to open the opening/closing switch (24, 82); and, a fixed magnet (21, 34, 43,-54, 64, 86) which is fixed in such a manner that it can hold the movable magnet (22, 35, 44, 55, 65, 87) at the second position. In particular, the present trigger device is characterized in that the fixed magnet (21, 34, 43, 54, 64, 86) is fixed to a frame (20, 32, 42, 52, 62) mounted to a car body so as to move in the same manner as the car body, and also in that, when a predetermined or greater acceleration is continuously applied to the movable magnet (22, 35, 44, 55, 65, 7) for a relatively long period of time, then the movable magnet (22, 35, 44, 55, 65, 87) is moved to the first position against a magnetic force acting between the movable and fixed magnets so as to be able to energize the ignition circuit electrically.

According to still another aspect of the invention, there is provided a start device which can be operated in response to a predetermined or greater acceleration to ignite a gas generator (8), the trigger device comprising: an ignition circuit including an electric ignition device (11) which, when electrically energized, can ignite the gas generator (8); an invertor (95) disposed in the ignition circuit to output a signal when an input signal is absent; switch means having a non-conductive blade (94) and capable of electrically energizing the ignition circuit by cutting away part of a conducting wire (96) provided in the ignition circuit; a movable magnet (93) of an inertially movable type which has a non-conductive blade on the surface thereof and is able to take a first position to electrically energize the ignition circuit by cutting away part of the ignition circuit by use of the non-conductive blade (94) and a second position not to energize the ignition circuit electrically; and, a fixed magnet (92) which is fixed such that it can hold the movable magnet (93) at the second position. In particular, the present trigger device is characterized in that the fixed magnet (92) is fixed to a frame (20) mounted to a car body so as to move in the same manner as the car body, and also in that, if a predetermined or greater acceleration is being continuously applied to the movable magnet (93) for a relatively long period of time, then the movable magnet (93) is moved toward the first position against a magnetic force acting between the movable magnet (93) and the fixed magnet (92) so as to be able to energize the ignition circuit electrically.

According to the above-mentioned structure of the invention, due to the fact that the movable magnet, which inherent inertia, is held at the second position to render the ignition circuit in a non-conductive state by applying an attracting or repelling magnetic force between the movable and fixed magnets, by properly setting the mutual magnetic force between the movable and fixed magnets and the moving distance of the movable magnet, there can be obtained easily a brake force for braking the movement of the movable magnet and also the sensitivity of the trigger device can be lowered with respect to pulse-like accelerations acting on the car body without requiring a high working accuracy or a complicated structure. Also, by properly combining the attracting and .repelling magnetic forces respectively acting between the movable and fixed magnets, a duration time, in which the brake force for braking the inertial movement of the movable magnet provides a constant value, can be to be relatively long, which in turn makes it easy to change the acceleration detection characteristic of a sensor.

DETAILED DESCRIPTION OF THE PREFERRED EMBODIMENTS

Description will be given hereinbelow in detail of an embodiment of a trigger device according to the invention with reference to the accompanying drawings.

Figure 1:
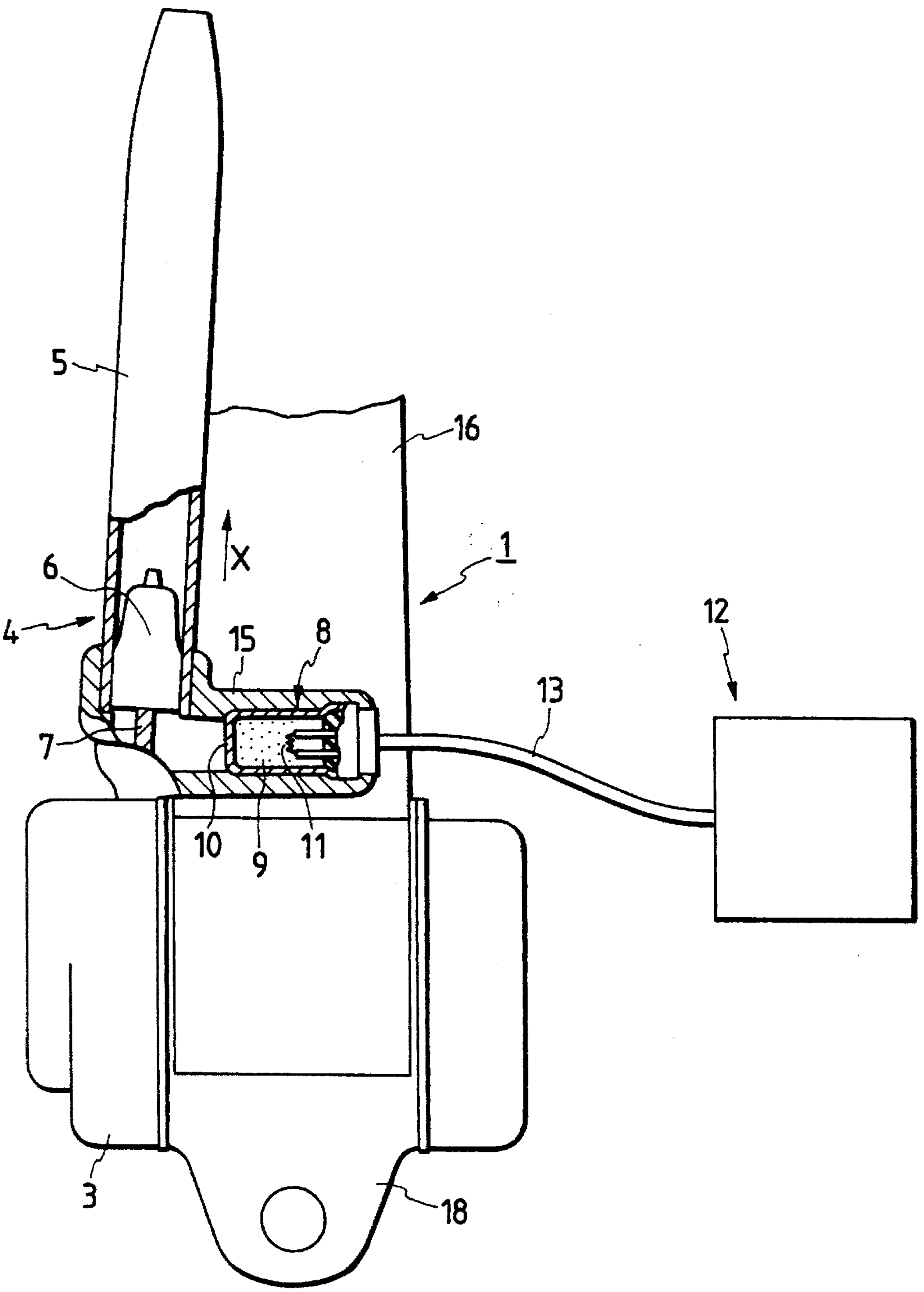
FIG. 1 a partially sectional front view of a retractor with a pretensioner which includes a trigger device according to a first embodiment of the invention.

In FIG. 1, a retractor 1 with a pretensioner includes a winding reel (not shown) around which a webbing 16 is wound in a freely take-in or take-out manner. On one base side wall of a retractor base 18 which is formed in a substantially U-like shape, there is disposed a pretensioner 3 serving as a seat belt tightening device which rotates a winding shaft in a direction where the slack of a seat belt is removed. The pretensioner 3 applies a tensile force to a cable-shaped member 7 extended over a pulley (not shown) journaled to the end portion of the winding shaft to cause the cable-shaped member 7 to drive and pull in the winding shaft in the webbing take-in direction, thereby being able to retract or pull in a webbing 16 extended over a passenger in case of emergency. The pretensioner 3 includes drive means 4 which is used to apply a tensile force to the cable-shaped member 7.

The drive means 4 comprises a piston 6 connected to one end of the cable-shaped member 7, a cylinder 5 which receives the piston 6 in a slidable manner, a housing 15 which is formed of a substantially L-shaped pipe member to communicate and connect the base end portion of the cylinder 5 with the gas injection portion of a gas generator 8, and the gas generator 8 which is disposed in the housing 15.

The gas generator 8 comprises a case 10, which stores therein ignition powder 9 and is sealed into the retractor base 18, and an ignition heater 11 which serves as an electric ignition device and is assembled into the case 10. And, to the gas generator 8, there is connected a signal line 13 which is in turn connected to a trigger device 12, so that the ignition heater 11 within the case 10 can be ignited in accordance with a detect signal from the trigger device 12 which detects a car collision or other similar accidents.

Figure 2:
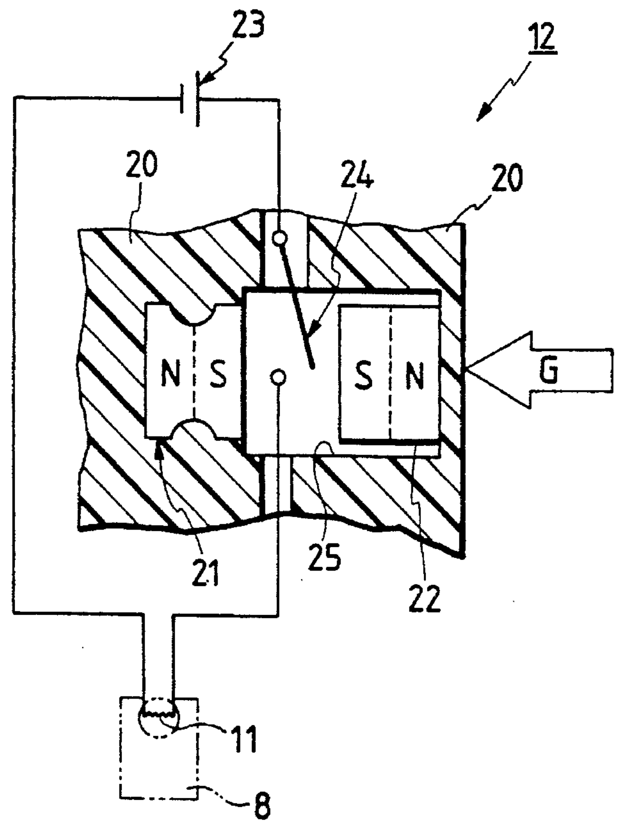
FIG. 2 is a schematic structure view of a trigger device according to the first embodiment of the invention.

Now, in FIG. 2, there is shown a schematic structure view of the trigger device 12 according to the first embodiment of the invention.

The trigger device 12 comprises an ignition circuit which, when an opening/closing switch 24 serving as switch means is closed, allows the electricity of a power supply 23 to flow to the ignition heater 11 to thereby ignite the gas generator 8, a cylindrical movable magnet 22 which can be inertially moved to a first position to close the opening/closing switch 24 to thereby energize the ignition circuit electrically when a car is suddenly decelerated, and a substantially cylindrical fixed magnet 21 which is fixed to a frame 20 mounted to a car body in such a manner that the fixed magnet 21 can hold the movable magnet 22 at a second position to open the opening/closing switch 24 by means of a repelling or repulsive magnetic force acting between the movable and fixed magnets 22 and 21.

The movable magnet 22 and fixed magnet 21 are respectively disposed such that they are opposed to each other with the opening/closing switch 24 between them. The fixed magnet 21 is fixed to a frame 20, which is formed of a non-magnetic member such as synthetic resin, stainless steel or the like and is mounted to the car body, so as to move in the same manner as the car body. On the other hand, the movable magnet 22, which has inherent of inertia, is movably inserted in a recess 25 formed in the frame 20. In this case, the movable magnet 22, which is disposed such that the magnetic pole thereof adjoining the fixed magnet 21 has the same polarity as the adjoining magnetic pole of the fixed magnet (in FIG. 2, S pole-S pole), is biased toward the bottom wall side of the recess 25 spaced apart from the opening/closing switch 24, that is, the movable magnet 22 is biased to the second position by means of a repelling magnetic force acting between the movable and fixed magnets.

Accordingly, normally, the movable magnet 22 can be slide within the recess 25 toward the opening/closing switch 24. However, unless a force greater than the repelling magnetic force acting between the fixed magnet 21 and movable magnet 22 is applied to the movable magnet 22 in the direction of the opening/closing switch 24 (FIG. 2, in the left direction), the movable magnet 22 cannot be moved to the first position to close the opening/closing switch 24 and, therefore, the trigger device 12 cannot be operated.

On the other hand, when, as in a car collision, a deceleration of the order of 600 to 1000 $m/s_2$ is given continuously to the car body for a relatively long period of time (of the order of 5 to 30 ms) and thus the force of inertia of the movable magnet 22, which force can be expressed as the multiplication of the weight of the movable magnet 22 by the acceleration thereof in the opening/closing switch 24 direction, becomes greater than the repelling magnetic force which acts between the fixed magnet 21 and the movable magnet 22, then the movable magnet 22 is moved to the first position to close the opening/closing switch 24. As a result of this, the ignition circuit is electrically energized to thereby heat the ignition heater 11, so that the heated ignition heater 11 in turn ignites the gas generator 8.

In this operation, by properly setting the mutual magnetic forces of the movable magnet 22 and fixed magnet 21 as well as the moving distance of the movable magnet 22, there can be easily obtained the optimum brake force to brake the movement of the movable magnet 22, which makes it possible to lower the sensitivity of the start device with respect to the pulse-like accelerations acting on the car body without requiring a high working accuracy or a complicated structure. This can enhance the sensitivity of the trigger device in a car collision without increasing the possibility of the malfunction thereof. At the same time, the acceleration detect characteristic of the trigger device can be changed easily by properly changing the respective sizes, the strengths of the magnetic forces of the movable magnet 22 and fixed magnet 21 and the like. This means that there can be provided a trigger device 12 which has a large degree of freedom of design.

Next, description will be given below of the operation of the above-mentioned retractor 1 with a pretensioner.

In the normal running condition of the car, the pretensioner 3 is not in engagement with the winding shaft and, for this reason, the winding shaft can be rotated freely. That is, the webbing 16 can be taken in by means of the force of a winding spring and also the webbing 16 can be taken out freely against the force of the spring.

If a deceleration of a certain strength such as sudden braking and the like occurs in the car, then the emergency lock mechanism (not shown) of the retractor 1 is operated to lock the rotation of the winding shaft. This can prevent the webbing from extending out but a force of inertia acting on the movable magnet 22 is smaller than the repelling magnetic force acting between the fixed magnet 21 and movable magnet 22 and thus the trigger device 12 will not be operated, so that the drive means 4 of the pretensioner 3 will not be operated.

On the other hand, if a very large deceleration, which could occur in a car collision and in similar accidents, is continuously given to the car body for a relatively long period of time and thus the inertial force acting on the movable magnet 22 becomes greater that the repelling magnetic force acting between the fixed magnet 21 and movable magnet 22, then the movable magnet 22 is moved to the first position to close the opening/closing switch 24, so that the ignition circuit is electrically energized to heat the ignition heater 11. And, if the gas generator 8 within the drive means 4 is ignited by the heated ignition heater 11 to generate a combustion gas within the cylinder 5, then the piston 6 is rapidly moved in an upward direction (in a direction of an arrow X shown in FIG. 1) due to the pressure of the thus generated combustion gas. Then, if the cable-shaped member 7 is pulled rapidly in the arrow X direction by a force of a given strength which is produced by the driving force of the piston 6, then the winding shaft is driven in the webbing take-in direction and thus the webbing extended over the passenger is drawn in to thereby remove the play of the seat belt.

In the above embodiment, the trigger device 12 according to the invention is applied as a trigger device which actuates the gas generator 8 of the retractor 1 with a pretensioner. However, this is not limitative but the trigger device 12 can also be applied as a trigger device which actuates a gas generator which is provided in an air bag device. Also, the trigger device of the invention is not limited to the structure of the trigger device 12 employed in the above embodiment, but similar operation and effects to those of the trigger device 12 employed in the above first embodiment can also be provided in other embodiments which will be described later.

Figure 3:
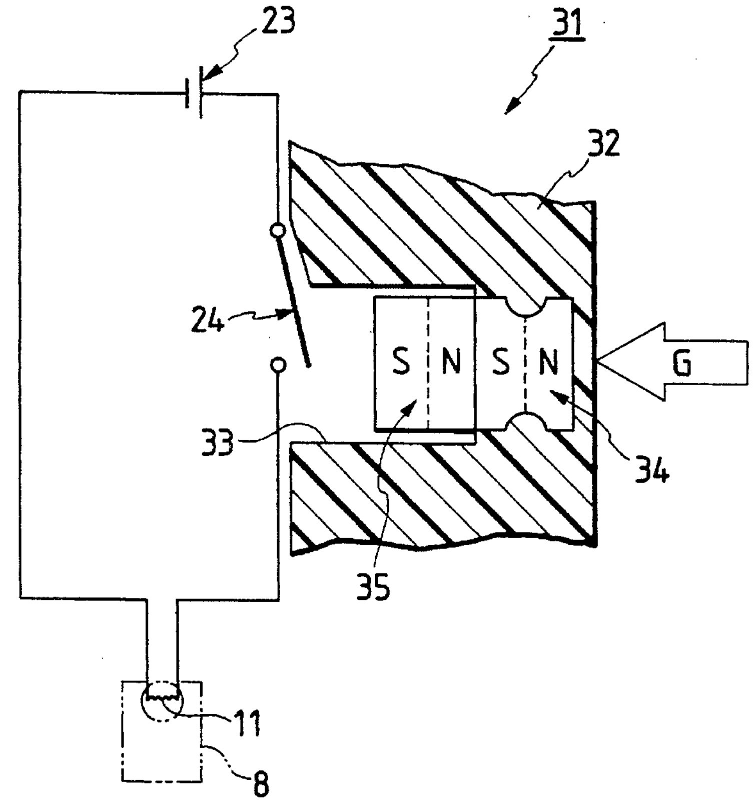
FIG. 3 is a schematic structure view of a trigger device according to a second embodiment of the invention.

For example, in FIG. 3, there is shown a schematic structure view of a trigger device 31 which is constructed in accordance with a second embodiment according to the invention.

The trigger device 31 includes an ignition circuit which, when the opening/closing switch 24 serving as switch means is closed, allows the electricity of the power supply 23 to flow to the ignition heater 11 to thereby ignite the gas generator 8, a cylindrical movable magnet 35 which, in the sudden deceleration of the car, is inertially movable to the first position to close the opening/closing switch 24 to thereby electrically energize the ignition circuit, and a substantially cylindrical fixed magnet 34 which is fixed such that it can hold the movable magnet 35 at the second position to open the opening/closing switch 24.

The fixed magnet 34 is fixed to the bottom wall portion of a recess 33 formed in a frame 32, which is formed of a non-magnetic member such as synthetic resin, stainless steel or the like and is mounted to a car body, so as to move in the same way as the car body, while the movable magnet 35 serving as an inertial member is movably inserted into the recess 33. Also, the above-mentioned opening/closing switch 24 is disposed on the opening end side of the recess 33. In this case, the movable magnet 35, which is disposed in such a way that the magnetic pole thereof adjoining the fixed magnet 34 has a different polarity from the adjoining magnetic pole of the fixed magnet 34, is attracted to the fixed magnet 34 fixed to the bottom wall portion of the recess 33, that is, the movable magnet 35 is held at the second position, where the movable magnet 35 is separated from the opening/closing switch 24, by means of an attracting magnetic force acting between the fixed magnet 34 and movable magnet 35.

Accordingly, normally, it is true that the movable magnet 35 can be slid within the recess 33 toward the opening/closing switch 24 but, if a force going in the direction of the opening/closing switch 24 (in Fig. 3, in the left direction) greater than the attracting magnetic force acting between the fixed magnet 34 and movable magnet 35 is not applied to the movable magnet 35, then the movable magnet 35 will not be moved to the first position and thus the opening/closing switch 24 cannot be closed, so that the start device 31 will not be operated.

On the other hand, if a very great deceleration, which could occur in a car collision or in similar emergency situation, is continuously applied to the car body for a relatively long period of time and thus the inertial force of the movable magnet 35, which is obtained by multiplying the weight of the movable magnet 35 and the acceleration of thereof in the opening/closing switch 24 direction, becomes greater than the attracting magnetic force acting between the fixed magnet 34 and movable magnet 35, then the movable magnet 35 is moved to the first position to close the opening/closing switch 24, so that the ignition circuit is electrically energized to thereby heat the ignition heater 11 and the thus heated ignition heater 11 in turn is able to ignite the gas generator 8.

Further, as has been described in the first and second embodiments, use of the repelling or attracting magnetic force is selected properly in accordance with the vibration transmission characteristic of the car body, responsibility with respect to accelerations other than the acceleration that could occur in a car collision, and the like, so that the degree of freedom of design of the trigger device can be increased.

Figure 4:
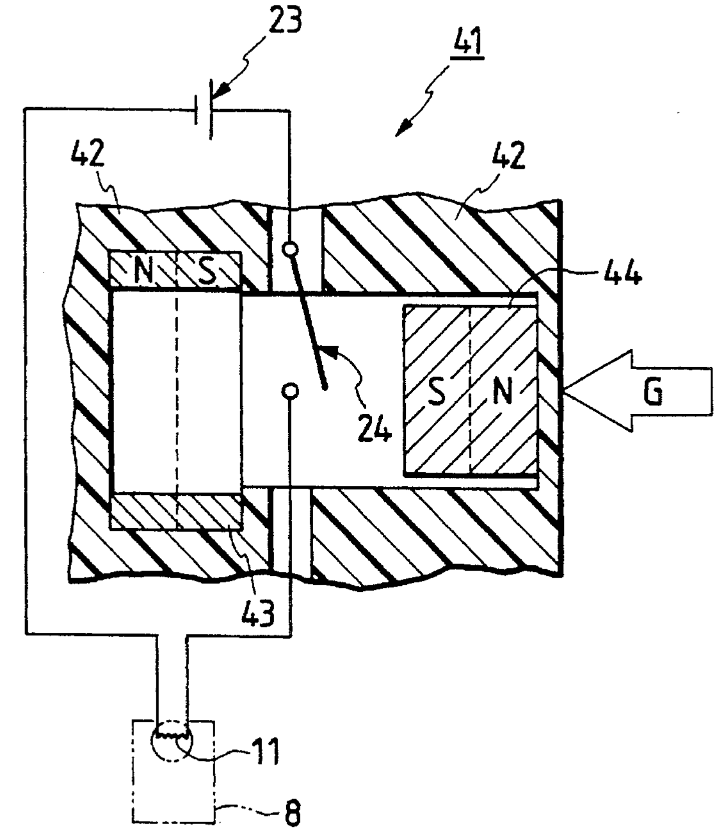
FIG. 4 is a schematic structure view of a trigger device according to a third embodiment of the invention.

Referring now to FIG. 4, there is shown a schematic structure view of a trigger device 41 which is Constructed in accordance with a third embodiment of the invention. In the trigger device 41, instead of the movable magnet 22 and fixed magnet 21 respectively employed in the first embodiment shown in FIG. 2, there are used a cylindrical movable magnet 44 and a fixed magnet 43 which is formed in a ring shape. However, the third embodiment is similar to the first embodiment in structure and thus the operation and effects of the third embodiment are also similar to those of the first embodiment.

Figure 5:
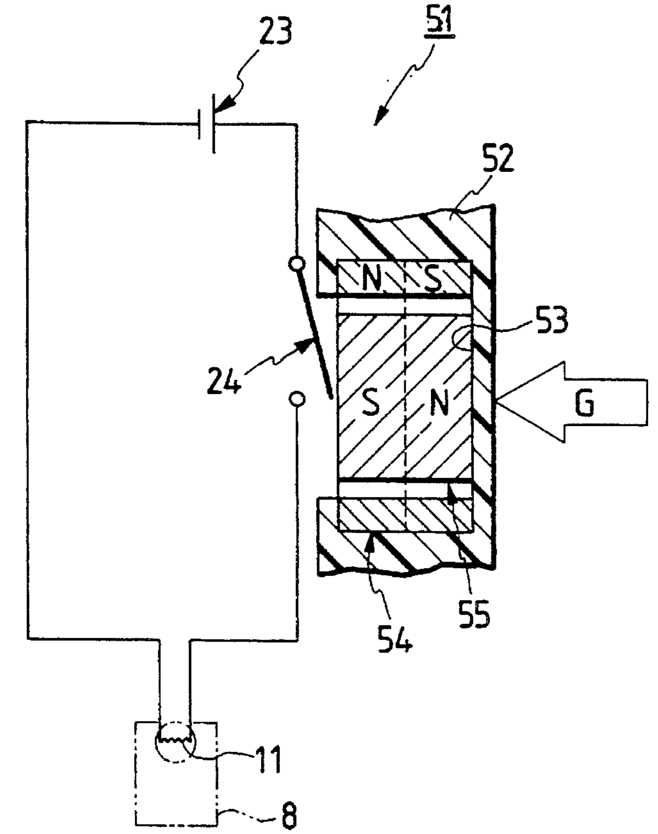
FIG. 5 is a schematic structure view of a trigger device according to a fourth embodiment of the invention.

Referring now to FIG. 5, there is shown a schematic structure view of a trigger device 51 which is constructed in accordance with a fourth embodiment of the invention.

The trigger device 51 includes a cylindrical movable magnet 55 which, when a car is decelerated suddenly, can be inertially moved to a first position to close an opening/closing switch 24 to thereby electrically energize the ignition circuit, and a ring-shaped fixed magnet 54 which is able to hold the movable magnet 55 at a second position to open the opening/closing switch 24 by means of an attracting magnetic force acting between the movable magnet 55.and fixed magnet 54.

The fixed magnet 54 is fixed within a recess 53 formed in a frame 52, which is formed of a non-magnetic member and mounted to a car body, so as to move in the same way as the car body, whereas the movable magnet 55, which has inherent inertia, is inserted so as to be movable into the hollow portion of the fixed magnet 54. Also, the opening/closing switch 24 is disposed on the opening end side of the recess 53. In this case, the movable magnet 55, which is disposed in such a manner that the magnetic pole thereof adjoining the fixed magnet 54 has a different polarity from the adjoining magnetic pole of the fixed magnet 54, is attracted and held within the hollow portion of the fixed magnet 54, that is, at the second position to open the opening/closing switch 24 by means of the attracting magnetic force acting between the fixed magnet 54 and the movable magnet 55.

In the above structure, normally, the movable magnet 55 can be slided along the cylindrical internal space of the fixed magnet 54 toward the opening/closing switch 24. However, unless a force greater than the attracting magnetic force acting between the fixed magnet 54 and the movable magnet 55 is applied to the movable magnet 55 in the direction of the opening/closing switch 24 (in FIG. 5, in the left direction), the movable magnet 55 will not be moved to the first position and thus the opening/closing switch 24 cannot be closed, so that the trigger device 51 will not be operated at all.

And, when a vary large deceleration, which could occur in a car collision or in other similar accidents, is given continuously to the car body for a relatively long period of time and thus the inertial force of the movable magnet 55, which is obtained by multiplying the weight of the movable magnet 55 and the acceleration thereof in the opening/closing switch 24 direction, becomes greater than the attracting magnetic force acting between the fixed magnet 54 and movable magnet 55, then the movable magnet 55 is moved to the first position to close the opening/closing switch 24. In other words, similarly to the trigger devices according to the above-mentioned embodiments of the invention, in the trigger device 51 according to the fourth embodiment of the invention, it is easy to set a brake force which brakes the movement of the movable magnet 55 and it is also possible to dull the sensitivity of the start device 51 with respect to pulse-like accelerations acting on the car body without requiring a high working accuracy nor a complicated structure.

Further, as in the above-mentioned third and fourth embodiments, when the fixed magnets 43, 54 are respectively formed in a ring shape and the movable magnets 44, 55 are respectively formed in a cylindrical shape, the magnetic force lines of the movable magnet extend differently from those of the fixed magnet and the magnetic force characteristic acting between them at the relative positions thereof varies. This increases the degree of freedom of design of the trigger device which can adapt the acceleration detect characteristic thereof more properly to the vibration transmission characteristic of the car body. Of course, even when the movable magnet is formed in a ring shape, the same effect can be obtained. And, both the movable and fixed magnets may be formed in a ring shape.

Figure 6:
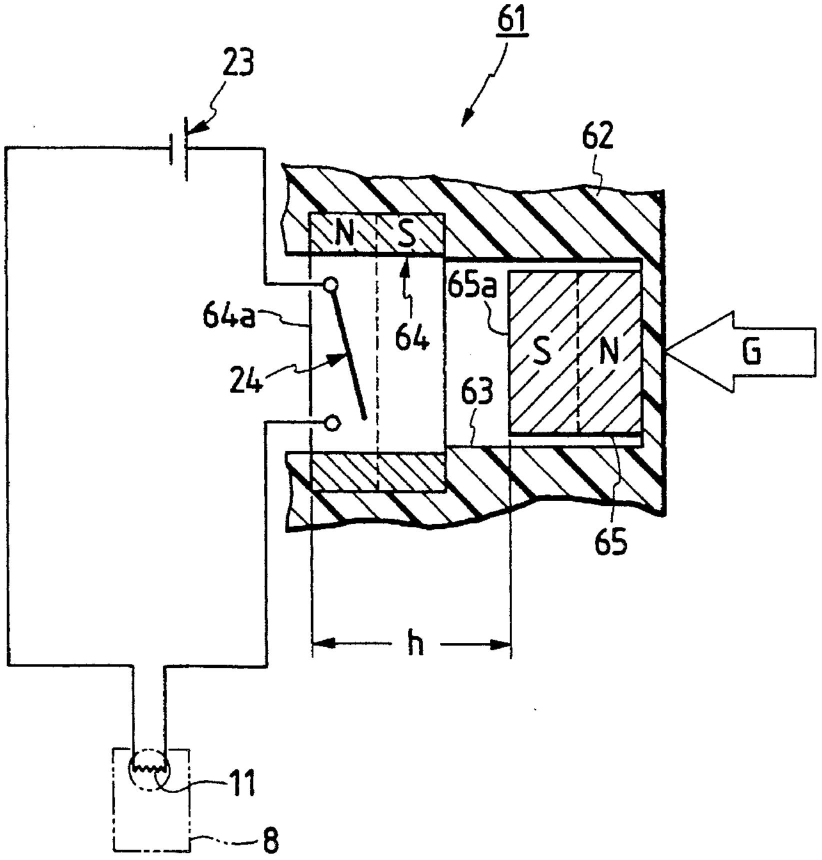
FIG. 6 is a schematic structure view of a trigger device according to a fifth embodiment of the invention.

In FIG. 6, there is shown a schematic structure view of a trigger device 61 which is constructed in accordance with a fifth embodiment of the invention.

The trigger device 61 includes an ignition circuit which, when an opening/closing switch 24 serving as switch means is closed, allows the electricity of a power supply 23 to flow to the above-mentioned ignition heater 11 to thereby ignite the gas generator 8, a cylindrical movable magnet 65 which, when a car is suddenly decelerated, can be inertially moved to a first position to close the opening/closing switch 24 to thereby electrically energize the ignition circuit, and a ring-shaped fixed magnet 64 which is fixed to a frame 62 mounted to a car body in such a manner that the fixed magnet can hold the movable magnet 65 at a second position where the opening/closing switch 24 is opened by means of a repelling magnetic force acting between the movable magnet 65.and fixed magnet 64. Further, the fixed magnet 64 has an inside diameter greater than the outside diameter of the movable magnet 65.

The fixed magnet 64 is fixed on the opening side end side of a recess 63 formed in a frame 62, which is formed of a non-magnetic member and is mounted to the car body, so as to move in the same way as the car body, and the inner peripheral wall of the fixed magnet 64 forms part of the inner wall of the recess 63 to thereby form an integral cylindrical space. The movable magnet 65, which is an inertial member, is mounted inside the recess 63 on the bottom wall portion side (in FIG. 6, on the right side) thereof. Also, the opening/closing switch 24 is disposed in the internal space on the opening end side of the fixed magnet 64. In this case, in the fixed magnet 64 and movable magnet 65 respectively disposed in such a manner that the mutually adjoining magnetic poles thereof are of the same polarity as shown in FIG. 6, a relationship between the relative positions H of the opening side end **65*a* of the movable magnet 65 with respect to the opening end side 64*a* of the fixed magnet 64 and the repelling/attracting magnetic forces can be obtained as shown by a graphical representation in FIG. 7**.

In the above structure, normally, the movable magnet 65, which is disposed in such a manner that the opening side end **65*a* thereof has a distance h with respect to the opening side end 64*a* of the fixed magnet 64 and the magnetic pole thereof adjoining the fixed magnet 64 has the same polarity as the adjoining magnetic pole of the fixed magnet 64 (in FIG. 6, S pole-S pole), is energized toward the bottom wall portion of the recess 63 apart from the opening/closing switch 24, that is, the movable magnet 65 is energized to the second position by means of a repelling magnetic force acting between the fixed magnet 64 and movable magnet 65. In other words, although the movable magnet 65 is slidable along the cylindrical internal space of the recess 63 toward the opening/closing switch 24, unless a force greater than the repelling magnetic force acting between the fixed magnet 64 and movable magnet 65 is applied to the movable magnet 65 in the direction of the opening/closing switch 24, the movable magnet 65 cannot be moved to the first position and thus it cannot close the opening/closing switch 24, so that the trigger device 61** will not be operated.

And, when a very large deceleration, which could occur in a car collision or in other similar accidents, is given continuously to the car body for a relatively long period of time and thus the inertial force of the movable magnet 65, which is obtained by multiplying the weight of the movable magnet 65 and the acceleration thereof in the opening/closing switch 24 direction, becomes greater than the repelling magnetic force acting between the fixed magnet 64 and movable magnet 65, then the movable magnet 65 is moved to the first position to close the opening/closing switch 24. Further, if the movable magnet 65 is moved to an area in which an attracting magnetic force acts on the movable magnet 65, then the movable magnet 65 is accelerated in the direction of the opening/closing switch 24 by means of the attracting magnetic force and is thus moved to the first position to close the opening/closing switch 24. As a result of this, the ignition circuit is electrically energized to thereby heat the ignition heater 11, so that the thus heated ignition heater 11 is able to ignite the gas generator 8.

In this case, similarly to the previously described embodiments, by properly setting the mutual magnetic forces of the movable magnet 65 and fixed magnet 64 as well as the moving distance of the movable magnet 65, there can be obtained easily an optimum brake force which brakes the movement of the movable magnet 65 and it is also possible to dull the sensitivity of the trigger device 61 with respect to pulse-like accelerations acting on the car body without requiring a high working accuracy nor a complicated structure. This makes it possible to enhance the sensitivity of the trigger device 61 in a car collision without increasing the possibility of the malfunction thereof.

Figure 7:
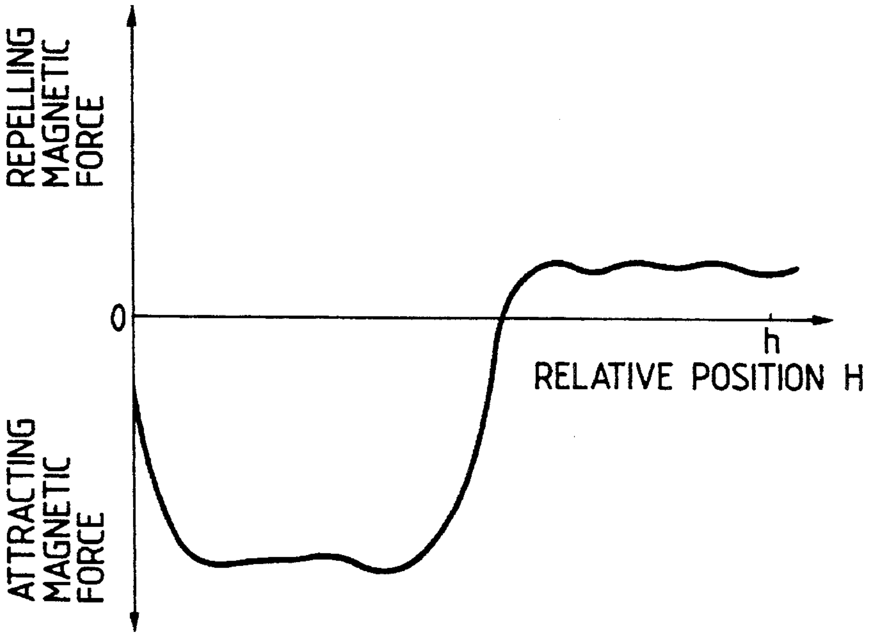
FIG. 7 is a graphical representation of a relationship between the relative positions H of the fixed and movable magnets shown in FIG. 6 and the repelling/attracting magnetic forces acting between the fixed and movable magnets.

Further, in the trigger device 61 according to the fifth embodiment, as can be seen clearly from FIG. 7, a duration time, during which the repelling magnetic force serving as the braking force to brake the inertial movement of the movable magnet 65 provides a constant value, can be set relatively long with ease. This makes it further easier to change the acceleration detect characteristic of the trigger device and thus increases the freedom of design thereof to a great extent.

Figure 8:
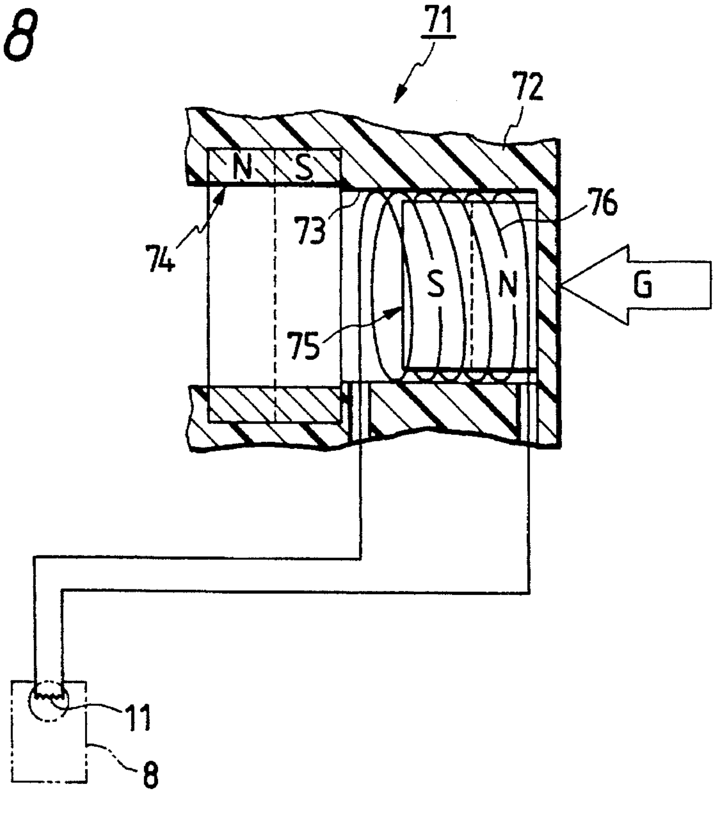
FIG. 8 is a schematic structure view of a trigger device according to a sixth embodiment of the invention.

Now, in FIG. 8, there is shown a schematic structure view of a trigger device 71 which is constructed in accordance with a sixth embodiment of the invention.

The trigger device 71 includes an ignition circuit which, responsive to an induced electromotive current produced when a magnet is moved within a coil 76, allows electricity to flow to the ignition heater 11 to thereby ignite the gas generator 8, a cylindrical movable magnet 75 which, when a car is suddenly decelerated, can be moved inertially to a first position to energize the ignition circuit, and a ring-shaped fixed magnet 74 fixed in such a manner that it can hold the movable magnet in a second position to restrict the movement of the movable magnet by means of a repelling magnetic force acting between the movable magnet 75 and fixed magnet 74. Further, the fixed magnet 74 has an inside diameter greater than the outside diameter of the movable magnet 75.

The movable magnet 75 and fixed magnet 74, similar to the previously described fifth embodiment shown in FIG. 6, are disposed within a recess 73 which is formed of a non-magnetic member and is mounted to the car body, and the coil 76 is extended round the movable magnet 75.

In the structure, normally, the movement of the movable magnet 75 is restricted by a repelling magnetic force acting between the fixed magnet 74 and movable magnet 75 and the movable magnet 75 is energized to the bottom wall side of the recess 73 which provides the second position. In other words, although the movable magnet 75 can be slid along the cylindrical internal space of the recess 73 toward the fixed magnet 74, if a force greater than the repelling magnetic force acting between the fixed magnet 74 and movable magnet 75 is not applied to the movable magnet 75 in the direction of the fixed magnet 74, then the movable magnet 75 will not be moved in the fixed magnet 74 direction which provides the first position, so that the trigger device 71 will not be operated.

And, when a very large deceleration, which could occur in a car collision or in other similar accidents, is given continuously to the car body for a relatively long period of time and thus the inertial force of the movable magnet 75, which is obtained by multiplying the weight of the movable magnet 75 and the acceleration thereof in the fixed magnet 74 direction, becomes greater than the repelling magnetic force acting between the fixed magnet 74 and movable magnet 75, then the movable magnet 75 is moved toward the fixed magnet 74. Further, if the movable magnet 75 is moved to an area in which an attracting magnetic force acts on the movable magnet 75, then the movable magnet 75 is accelerated in the direction of the fixed magnet 74, where is at the first position, and is moved at high speeds within the coil 76 by means of the attracting magnetic force, thereby producing an induced electromotive current in the coil 76. As a result of this, the ignition circuit is energized electrically to thereby heat the ignition heater 11, so that the thus heated ignition heater 11 is able to ignite the gas generator 8.

In this case, similarly to the previously described embodiments, by properly setting the mutual magnetic forces of the movable magnet 75 and fixed magnet 74 as well as the moving distance of the movable magnet 75, there can be obtained easily an optimum force which brakes the movement of the movable magnet 75 and it is also possible to dull the sensitivity of the trigger device 71 with respect to pulse-like accelerations acting on the car body without requiring a high working accuracy nor a complicated structure. This make it possible to enhance the sensitivity of the trigger device 71 in a car collision without increasing the possibility of the malfunction thereof.

Further, the ignition circuit employed in the trigger device 71 according to the sixth embodiment of the invention is a no-contact circuit having no switch means and also does not require a power supply. Therefore, the circuit can be simplified and can also eliminate the possibility of poor contact, so that the reliability of the circuit can be improved. The method of electrically energizing the ignition circuit is not limited to the induced electromotive current by means of the coil 76, but a well-known magnetic sensor and the like can also be used, alternatively.

Figure 9:
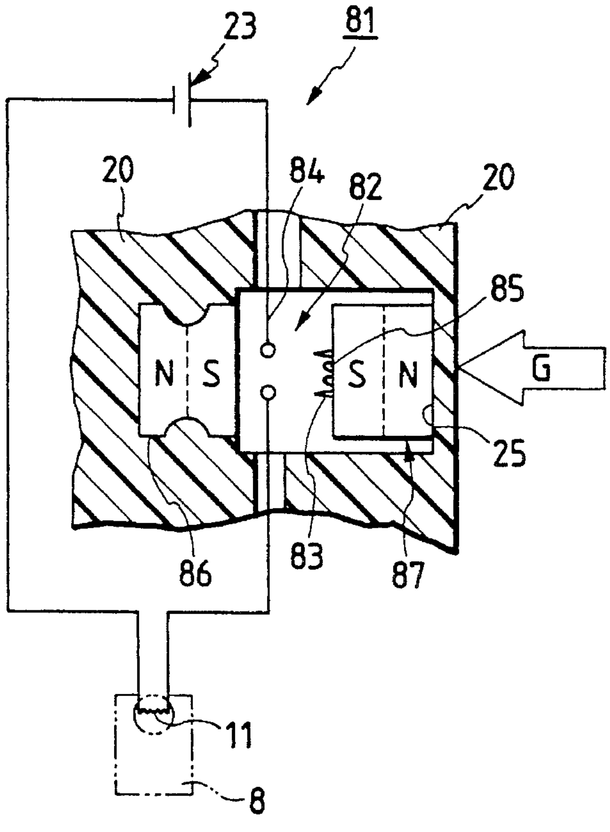
FIG. 9 is a schematic structure view of a trigger device according to a seventh embodiment of the invention; and, FIG. 10 is a schematic structure view of a trigger device according to an eighth embodiment of the invention.

Referring now to FIG. 9, there is shown a schematic structure view of a trigger device 81 which is constructed in accordance with a seventh embodiment of the invention.

The trigger device 81 has a similar structure to the trigger device 12 which is shown and is constructed in accordance with the first embodiment of the invention, except that a short-circuit switch 82 is employed instead of the switch means, that is, the opening/closing switch 24. The short-circuit switch 82 comprises the opened part of a conducting wire 84 provided in the ignition circuit and a pair of needle-shaped electrodes 83 which are disposed on the surface of a movable magnet 87 opposed to the opened part of the conducting wire 84 and which electrically connected are conducted by a conducting wire 85. That is, the short-circuit switch 82 is switch means which permits the needle-shaped electrodes 83 to short-circuit the opened part of the conducting wire 84 to thereby electrically energize the ignition circuit.

In the present structure, normally, the movable magnet 87 is energized to the bottom portion of a recess 25 formed in a frame 20, which is formed of a non-magnetic member and is mounted to the car body, by means of a repelling magnetic force acting between the movable magnet 87 and fixed magnet 86, that is, the movable magnet 87 is energized to the second position thereof. In other words, in the normal position thereof, the movable magnet 87 cannot be moved to the first position thereof and thus is not able to close the short-circuit switch 82, so that the start device 81 will not be operated.

And, when a very large deceleration, which could occur in a car collision or in other similar accidents, is given continuously to the car body for a relatively long period of time and thus the inertial force of the movable magnet 87, which is obtained by multiplying the weight of the movable magnet 87 and the acceleration thereof in the fixed magnet 86 direction, becomes greater than the repelling magnetic force acting between the fixed magnet 86 and movable magnet 87, then the movable magnet 87 is moved to the first position to close the short-circuit switch 82. As a result of this, the ignition circuit is electrically energized to heat the ignition heater 11 and thus the heated ignition heater 11 ignites the gas generator 8.

In this case, the needle-shaped electrode 83 are thrust into the conducting wire 84 rubbing against each other and conduct and, therefore, even if the surface of the contact portion of the conducting wire 84 is oxidized to cause poor conduction, the needle-shaped electrodes 83 are able to reach the deeper non-oxidized, internal portion of the conducting wire 84 That is, according to the seventh embodiment, the reliability of the switch means can be enhanced even if the surface treatment of the contact portion of the conducting line 84 is not taken into consideration. Alternatively, a pair of spaced conducting plates may be connected respectively to the respective open end portions of the opened part of the conducting wire 84, so that the pair of needle-shaped electrodes 83 may be thrust respectively into the conducting plates to thereby short-circuit the opened part.

Figure 10:
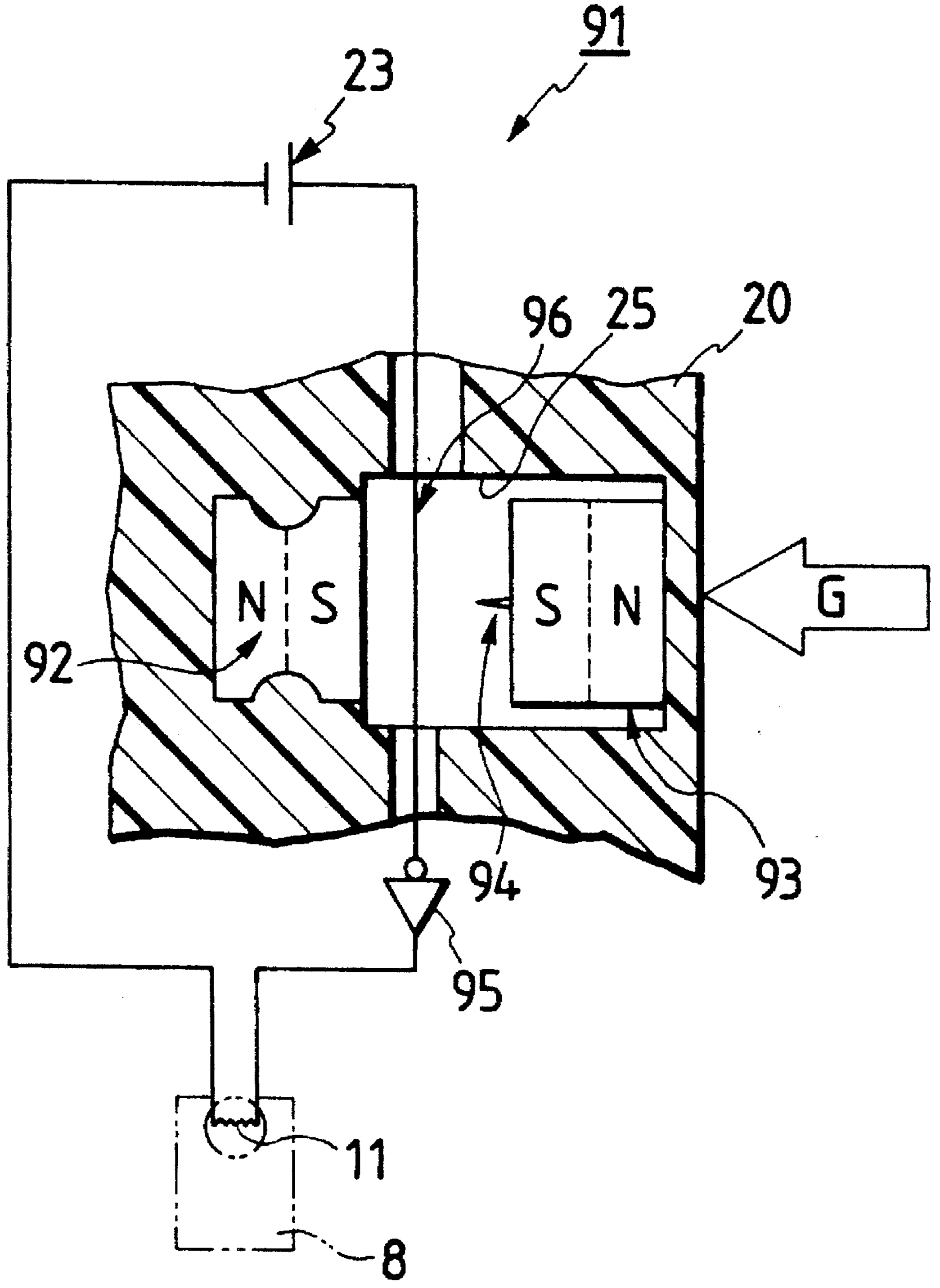

Now, in FIG. 10, there is shown a schematic structure view of a trigger device 91 which is constructed in accordance with an eighth embodiment of the invention.

The trigger device 91 has a similar structure to the trigger device 12 which is shown in FIG. 2 and is constructed in accordance with the first embodiment of the invention, except that it uses an inverting mechanism including an invertor 95 instead of the opening/closing switch 24 serving as the switch means. The inverting mechanism includes in the ignition circuit an invertor 95 which outputs a signal when an input signal is absent and also a non-conductive blade 94 of ceramic material on the surface of a movable magnet 93 which is disposed opposed to a conducting wire 96 provided in the ignition circuit, That is, the inverting mechanism is switch means which permits the non-conductive blade 94 to cut part of the conducting wire 96 of the ignition circuit to thereby electrically energize the ignition circuit.

In the present structure, normally the movable magnet 93 is biased to the second position thereof, that is, to the bottom wall of a recess 25 formed in a frame 20, which is formed of a non-magnetic member and is mounted to the car body, by means of a repelling magnetic force acting between the movable magnet 93 and fixed magnet 92 and, therefore, the movable magnet 93 is prevented from moving to the first position thereof where the non-conductive blade 94 permitted to cut part of the conducting wire 96, so that the trigger device 91 will not be operated. And, when a very large deceleration, which could occur in a car collision or in other similar accidents, is given to the car body continuously for a relatively long period of time and thus the inertial force of the movable magnet 93, which is obtained by multiplying the weight of the movable magnet 93 and the acceleration thereof in the fixed magnet 92 direction, becomes greater than the repelling magnetic force acting between the fixed magnet 92 and movable magnet 93, then the movable magnet 93 is moved to the first position to permit the non-conductive blade 94 to cut part of the conducting wire 96, thereby energizing the ignition circuit electrically. As a result o# this, the ignition circuit heats the ignition heater 11 to thereby ignite the gas generator 8.

The shapes and structures of the fixed magnet, movable magnet and ignition circuit forming the trigger device of the invention are not limited to those employed in the above-mentioned embodiments of the invention but, of course, other various changes and modifications are possible within the scope and spirit of the present invention.

According to the trigger device of the invention, due to the fact that the movable magnet, which is a member of inertia, is held at the second position thereof not to energize the ignition circuit electrically by means of an attracting or repelling magnetic force acting between the movable and fixed magnets, by properly setting the mutual magnetic forces of the movable and fixed magnets as well as the moving distance of the movable magnet, there can be obtained easily a brake force which brakes the movement of the movable magnet to thereby dull the sensitivity of the trigger device with respect to pulse-like accelerations acting on the car body without requiring a high working accuracy nor a complicated structure. That is, the present invention can enhance the sensitivity of the trigger device in a car collision without increasing the possibility of the malfunction thereof.

Also, by properly combining the attracting and repelling magnetic forces acting between the movable and fixed magnets, it is easy to set a relatively long duration time during which the brake force to brake the inertial movement of the movable magnet provides a constant value. This makes it possible to change the acceleration detect characteristic of the sensor easily and also increases the freedom of design of the start device.

Therefore, the present invention can prevent the malfunction of the start device to thereby enhance the reliability thereof, and also can provide a trigger device which is simple in structure, is easy to assemble and is inexpensive.

What is claimed is:

1. A trigger device operable in response to an acceleration exceeding a predetermined value to ignite a gas generator in a vehicle, the trigger device comprising:

a power supply;

an electric ignition device coupled to the gas generator;

switch means connected between the electric ignition device and the power supply to selectively energize the electric ignition device;

a moveable magnet moveable between a first position, wherein the switch means is operated to energize the electric ignition device, and a second position wherein the switch means is not operated; and a fixed magnet fixedly mounted to a frame of the vehicle to bias the moveable magnet toward the second position by a magnetic force acting between a first magnetic pole of the movable magnet and a second magnet pole of the fixed magnet, the first magnetic pole of the movable magnet adjoining the second magnetic pole of the fixed magnet;

wherein the movable magnet is disposed proximate the fixed magnet so that the movable magnet is inertially moved toward the first position against the magnetic force when acceleration is applied to the movable magnet continuously for at least a predetermined period of time.

2. The trigger device of claim 1, wherein the movable magnet is disposed with respect to the fixed magnet so that the first magnetic pole of the movable magnet opposes the second magnetic pole of the fixed magnet, which has the same polarity as the first magnetic pole, the movable magnet being energized to the second position by a repulsive magnetic force acting between the movable magnet and the fixed magnet, and wherein the movable magnet is disposed proximate the fixed magnet so that the movable magnet is inertially moved toward the first position against the repulsive magnetic force to operate the switch means if an inertial force acting on the movable magnet is greater than the repulsive magnetic force acting between the movable magnet and the fixed magnet.

3. The trigger device of claim 2, wherein the movable magnet and the fixed magnet are respectively disposed so as to mutually face to each other with the switch means disposed between the movable magnet and the fixed magnet.

4. The trigger device of claim 2, wherein the fixed magnet is formed in a ring shape, and the switch means is disposed in an internal space existing on an opening end side of the fixed magnet.

5. The trigger device of claim 1, wherein the movable magnet is disposed proximate the fixed magnet so that the first magnetic pole of the movable magnet opposes the second magnetic pole of the fixed magnet, which has the different polarity from the first magnetic pole, the movable magnet being held at the second position by an attracting magnetic force acting between the movable magnet and the fixed magnet, and wherein the movable magnet is disposed proximate the fixed magnet so that the movable magnet is inertially moved toward the first position against the attracting magnetic force to operate the switch means if an inertial force acting on the movable magnet is greater than the attracting magnetic force acting between the movable magnet and the fixed magnet.

6. The trigger device of claim 1, wherein the movable magnet includes a pair of needle-shaped electrodes on a surface which opposes the fixed magnet, said electrodes being electrically connected to each other, the switch means comprises a conducting wire and in which the needle-shaped electrodes contact the conducting wire and provide a short-circuit between open ends of the conducting wire for energizing the electric ignition device wherein the moveable magnet is in the first position.

7. A trigger device operable in response to an acceleration exceeding a predetermined value to ignite a gas generator in a vehicle, the trigger device comprising:

an electric ignition device coupled to the gas generator;

a coil disposed in a recess formed in a frame of the vehicle, and the coil being electrically connected to the electric ignition device;

a moveable magnet disposed movably within the coil for generating an induced electromotive current in accordance with a movement of the moveable magnet, the movable magnet being moveable between a first position and a second position; and a fixed magnet fixed to the frame of the vehicle, the fixed magnet being disposed proximate the movable magnet so that a first magnetic pole of the movable magnet opposes a second magnetic pole of the fixed magnet, which has the same polarity as the first magnetic pole, the movable magnet being energized to the second position by a repulsive magnetic force acting between the movable magnet and the fixed magnet;

wherein the movable magnet is disposed proximate the fixed magnet so that the movable magnet is inertially moved toward the first position against the repulsive magnetic force to energize the electric ignition device by the electromotive current if an inertial force acting on the movable magnet is greater than the repulsive magnetic force acting between the movable magnet and the fixed magnet the acceleration is applied continuously for at least the predetermined period of time.

8. A trigger device operable in response to an acceleration exceeding a predetermined value to ignite a gas generator, for use in a seat belt tightening device which is driven by a gas pressure to rotate a winding shaft of a retractor in a seat belt retracting direction in a vehicle collision, the trigger device comprising:

a power supply;

an ignition heater coupled to the gas generator;

an opening/closing switch connected between the ignition heater and the power supply to selectively energize the ignition heater;

a movable magnet moveable between a first position, wherein the opening/closing switch is closed to energize the ignition heater, and a second position wherein the opening/closing switch is open; and a fixed magnet fixedly mounted to a frame of the vehicle proximate the moveable magnet to hold the movable magnet at the second position by a magnetic force acting between the movable magnet and the fixed magnet;

wherein the movable magnet is disposed proximate the fixed magnet so that the movable magnet is inertially moved toward the first position against the magnetic force when acceleration is applied to the movable magnet continuously for at least a predetermined period of time.

9. The trigger device of claim 8, wherein the movable magnet is disposed so that a first magnetic pole of the movable magnet opposes a second magnetic pole of the fixed magnet, which has the same polarity as the first magnetic pole, the movable magnet being biased to the second position by a repulsive magnetic force acting between the movable magnet and the fixed magnet; and wherein the movable magnet is disposed proximate the fixed magnet so that the movable magnet is inertially moved towards the first position against the repulsive magnetic force to operate the opening/closing switch if an inertial force acting on the movable magnet is greater than the repulsive magnetic force acting between the movable magnet.

10. The trigger device of claim 9, wherein the movable magnet and the fixed magnet are respectively disposed to mutually oppose each other with the opening/closing switch between the movable magnet and the fixed magnet.

11. The trigger device of claim 8, wherein the movable magnet is disposed so that a first magnetic pole of the movable magnet adjoins a second magnetic pole of the fixed magnet, which has the different polarity from the first magnetic pole, the movable magnet being held at the second position by an attracting magnetic force acting between the movable magnet and the fixed magnet; and wherein the movable magnet is disposed proximate the fixed magnet so that the movable magnet is inertially moved toward the first position against the attracting magnetic force to operate the opening/closing switch if an inertial force acting on the movable magnet is greater than the attracting magnetic force acting between the movable magnet and the fixed magnet.

12. The trigger device of claim 9, wherein the fixed magnet is formed in a ring shape, and the opening/closing switch is disposed in an internal space existing on an opening end side of the fixed magnet.

13. A trigger device operable in response to an acceleration exceeding a predetermined value to ignite a gas generator, the trigger device comprising:

a power supply;

an electric ignition device coupled to the gas generator;

an inverter disposed in an ignition circuit of the electronic ignition device to output a signal when an input signal is absent;

a moveable magnet having a non-conductive blade, thereon for energizing the electric ignition device by cutting a conducting wire provided in the ignition circuit;

said movable magnet being moveable between a first position to cut the conducting wire with the non-conductive blade so as to energize the electric ignition device and a second position remote from the conducting wire so as not to energize the electric ignition device, the nonconductive blade being disposed on a surface of the movable magnet; and a fixed magnet being fixedly mounted to a frame of the vehicle in opposition to the surface of the moveable magnet to hold the movable magnet at the second position by a magnetic force acting between the movable magnet and the fixed magnet;

wherein the movable magnet is disposed proximate the fixed magnet so that the movable magnet is inertially moved toward the first position against the magnetic force when the acceleration is applied to the movable magnet continuously for at least a predetermined period of time.

* * * * *